United States Patent [19]
Lee

[11] Patent Number: 5,448,510
[45] Date of Patent: Sep. 5, 1995

[54] METHOD AND APPARATUS FOR PRODUCING THE RECIPROCAL OF AN ARBITRARY ELEMENT IN A FINITE FIELD

[75] Inventor: Jong-hwan Lee, Seoul, Rep. of Korea

[73] Assignee: Samsung Electronics Co., Ltd., Kyungki-do, Rep. of Korea

[21] Appl. No.: 125,269

[22] Filed: Sep. 23, 1993

[30] Foreign Application Priority Data

Nov. 30, 1992 [KR] Rep. of Korea .................. 92-22937

[51] Int. Cl.$^6$ .............................................. G06F 7/00
[52] U.S. Cl. ............................................. 364/746.1
[58] Field of Search .................. 364/746.1, 761, 764, 364/765

[56] References Cited

U.S. PATENT DOCUMENTS 4,975,867 12/1990 Weng .................. 364/746.1
4,989,171 1/1991 Hollmann .................. 364/746.1
4,994,995 2/1991 Anderson et al. .................. 364/746.1

OTHER PUBLICATIONS

Wang et al., "VLSI Architectures for Computing Multiplication and Inverses in GF (2$^m$)", IEEE Transactions on Computer, vol. C-34, No. 8, 1985, pp. 709–717.

Primary Examiner—Roy N. Envall, Jr.
Assistant Examiner—Chuong D. Ngo
Attorney, Agent, or Firm—Lowe, Price, LeBlanc & Becker

[57] ABSTRACT

A method for producing the reciprocal of an arbitrary element in a finite field GF(2$^n$) having a primitive element, the reciprocal of the primitive element and an identity element for multiplying. The method includes the steps of comparing the arbitrary element with the identity element of multiplying; producing the identity element of multiplying as the reciprocal of the arbitrary element, provided that the arbitrary element is the same as the identity element; recursively multiplying it by the primitive element by the identity element so as to produce a first element, and recursively multiplying the identity element by the reciprocal of primitive element so as to produce a second element, until one of the first and second elements equals the arbitrary element, provided that the arbitrary element is different from the identity element; and producing the second element as the reciprocal of the arbitrary element if the first element equals the arbitrary element, and producing the first element as the reciprocal of the arbitrary element if the second element equals the arbitrary element.

8 Claims, 3 Drawing Sheets

METHOD AND APPARATUS FOR PRODUCING THE RECIPROCAL OF AN ARBITRARY ELEMENT IN A FINITE FIELD

BACKGROUND OF THE INVENTION

The present invention relates to computation in a finite field, and more particularly, to a method and apparatus for obtaining the reciprocal of an arbitrary element in the Galios field $GF(2^n)$.

Computation in the finite field $GF(2^n)$ is employed to the systems each performing the functions related to error correction codes, switching theory and cryptography. Therefore, simplification of the computation in the finite field $GF(2^n)$ plays an important role in enhancing the efficiency of a system performing the functions described above.

To explain conventional computation in the finite field $GF(2^n)$ in detail, we should consider the decoding algorithm for Bose Chaudhuri Hocquenghem (BCH) codes and the computation in the finite field $GF(2^n)$ related to its algorithm.

The decoding algorithm for BCH codes is constituted by the following four steps.

First step: producing syndromes in accordance with the received vector.

Second step: producing the coefficients of an error location polynomial using the syndromes.

Third step: obtaining the roots of the error location polynomial.

Fourth step: producing the error values and then error-correcting based on the error values and the error locations that are the roots of the error location polynomial.

Here, if the BCH codes is for correcting two errors or more, the computation for the reciprocal of the syndrome produced in the first step is performed in the second step. Here, the error location polynomial for the BCH codes which is capable of correcting two errors is represented as:

$$\sigma(x) = 1 + \sigma_1 x + \sigma_2 x^2$$
$$= 1 + S_1 x + x^2 \left( \frac{S_1^3 + S_3}{S_1} \right)$$

To obtain $\sigma_2$, $S_1^{-1}$ should be calculated. In the conventional method for computing the reciprocal of an arbitrary element in the finite field, however, no algorithm has yet been proposed which is suitable for hardware implementation.

Accordingly, the computation for obtaining the reciprocal of an arbitrary element in the finite field $GF(2^n)$, utilizes a look-up table which stores in advance the reciprocals of all numbers in the finite field $GF(2^n)$. FIG. 1 shows a look-up table constituted by a read only memory (ROM), in which an arbitrary element or equivalent is applied to the input of the look-up table as an address, to thus produce its reciprocal. Here, the reciprocal stored in the look-up table, as well as the address, are both constituted by n-bits. Therefore, the size of the look-up table is $2^n \times n$.

As described above, in using the look-up table for obtaining the reciprocal, as the number of bits of an element in the finite field $GF(2^n)$ increases, the required memory size increases by a geometric progression.

SUMMARY OF THE INVENTION

Accordingly it is an object of the present invention to provide a method for producing the reciprocal of an arbitrary element in a finite field, which is suitable for hardware implementation, due to its characteristic features.

The other object of the present invention is to provide an apparatus for producing the reciprocal of an arbitrary element in a finite field in accordance with the above method, which can be integrated and miniaturized due to its simple structure.

To attain the object of the present invention, there is provided a method for producing the reciprocal of an arbitrary element in a finite field $GF(2^n)$ having a primitive element, the reciprocal of said primitive element and an identity element for multiplying, the method comprising the steps of:

comparing the arbitrary element with the identity element of multiplying;

producing the identity element of multiplying as the reciprocal of the arbitrary element, provided that the arbitrary element is the same as said identity element;

recursively multiplying the identity element by the primitive element so as to produce a first element, and recursively multiplying the identity element by the reciprocal of said primitive element so as to produce a second element, until one of the elements equals the arbitrary element, provided that the arbitrary element is different from the identity element; and producing the second element as the reciprocal of the arbitrary element if the first element equals the arbitrary element, and producing the first element as the reciprocal of the arbitrary element if the second element equals the arbitrary element.

To attain the other object of the present invention, there is provided an apparatus for producing the reciprocal of an arbitrary element in a finite field having a primitive element, the reciprocal of said primitive element and an identity element of multiplying, the apparatus comprising:

first means for generating the identity element;

second means for loading the identity element as an initial value and then recursively multiplying it by the primitive element, to produce a first element;

third means for loading the identity element as an initial value and then recursively by multiplying the reciprocal of the primitive element, to produce a second element; and fourth means for producing the second element as the reciprocal of the arbitrary element when the first element equals the arbitrary element and producing the first element as the reciprocal of the arbitrary element when the second element equals the arbitrary element.

The above objects and other advantages of the present invention will become more apparent by describing in detail a preferred embodiment thereof with reference to the attached drawings.

DETAILED DESCRIPTION OF THE INVENTION

Figure 1:
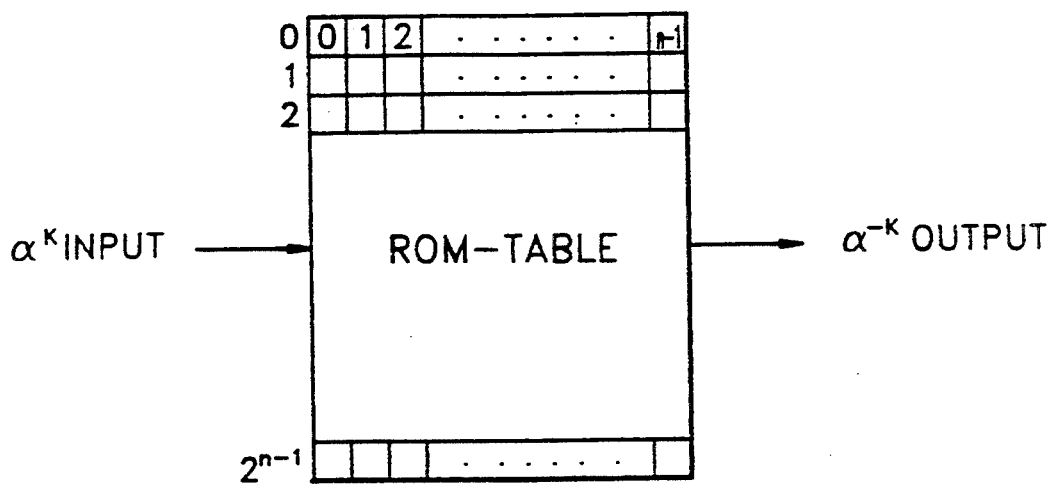
FIG. 1 shows a conventional look-up table for producing the reciprocal of an arbitrary element in a finite field $GF(2^n)$.
Figure 2:
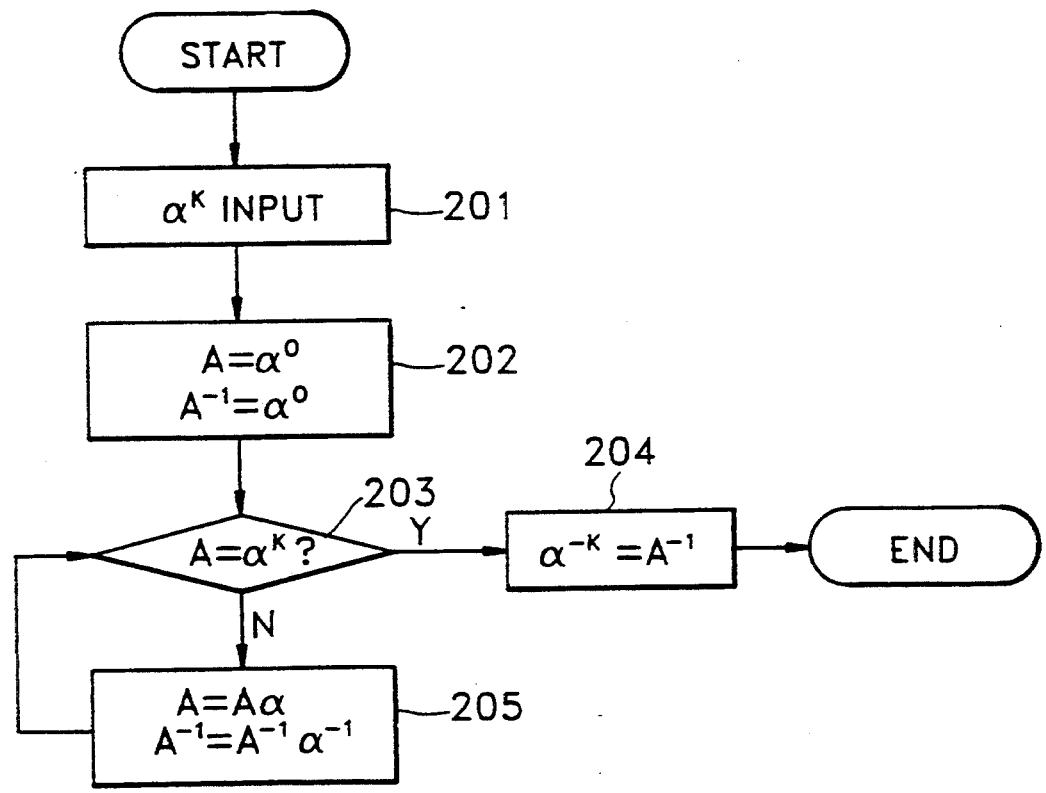
FIG. 2 is a flow chart which represents a method for producing the reciprocal of an arbitrary element in a finite field $GF(2^n)$, according to one embodiment of the present invention.

FIG. 2 is a flow chart which represents a method for producing the reciprocal of an arbitrary element in a finite field $GF(2^n)$, according to one embodiment of the present invention.

In step 201, an arbitrary element $\alpha^k$ constituted by n bits and pertaining to the finite field $GF(2^n)$ is input.

In step 202, the identity element $\alpha^0$ for multiplying substitutes variables A and $A^{-1}$. Here, the bit basis representation of the identity element $\alpha^0$ is (100 ... 0) in which the most significant bit (MSB) is located on the right and the least significant bit (LSB) is located on the left.

Step 203 determines whether the value of variable A is equal to the arbitrary element $\alpha^k$. If the value of variable A is equal to $\alpha^k$, the next operation advances to step 204. Otherwise, the next operation is step 205.

In step 205, the variables A and $A^{-1}$ are multiplied by the primitive element $\alpha$ and the reciprocal of the primitive element $\alpha^{-k}$, respectively, and then the variables A and $A^{-1}$ are substituted by each of the products, respectively. Thus, multiplication is recursively performed until the variable A is equal to the arbitrary element $\alpha^k$.

The step 204 is performed when the variable A is equal to the arbitrary element $\alpha^k$, whereby the variable $A^{-1}$ is produced as the reciprocal of the arbitrary element $\alpha^k$.

Figure 3:
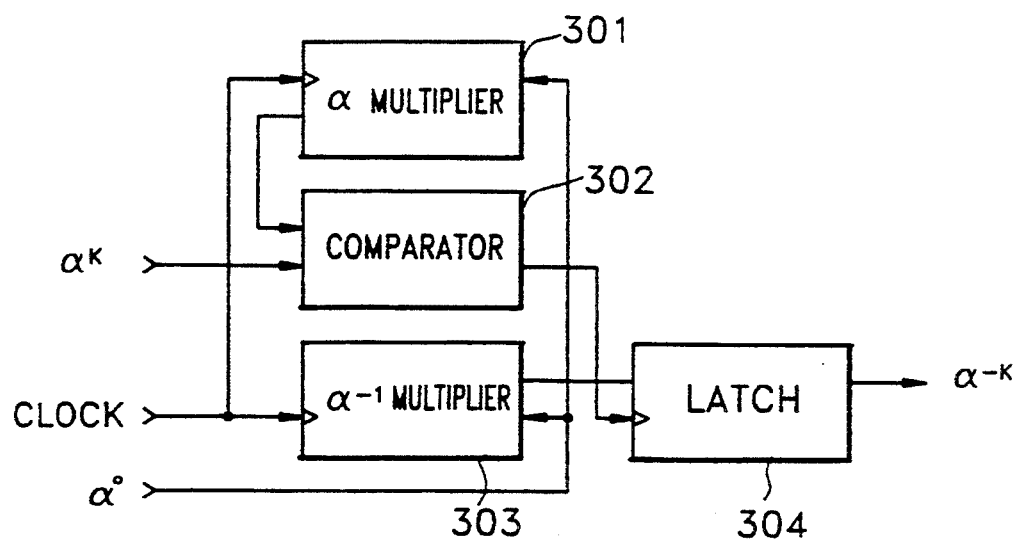
FIG. 3 is a block diagram of an apparatus which produces the reciprocal of an arbitrary element in a finite field $GF(2^n)$, which performs the method explained in FIG. 2.

FIG. 3 is a block diagram of an apparatus which produces the reciprocal of an arbitrary element in a finite field $GF(2^n)$, according to another embodiment of the present invention. The apparatus includes an $\alpha$ multiplier 301, a comparator 302, an $\alpha^{-1}$ multiplier 303 and a latch 304. Also, the apparatus includes an identity element generator not shown in FIG. 3.

Referring to FIG. 3, $\alpha$ multiplier 301 loads the identity element $\alpha^0$ from the identity element generator at first, and then multiplies by the primitive element $\alpha$, recursively at every successive clock pulse. Meanwhile, the $\alpha^{-1}$ multiplier 303 loads the identity element $\alpha^0$ from the identity element generator at first, and then multiplies by the reciprocal of the primitive element $\alpha^{-1}$, recursively at every successive clock pulse. Comparator 302 receives the output of the $\alpha$ multiplier 301 and the arbitrary element $\alpha^k$, and then determines whether they have the same values so as to produce a latch signal. The input of latch 304 is coupled to the output of $\alpha^{-1}$ multiplier 303 and its clock port is coupled to the output of comparator 302, for latching the output of $\alpha^{-1}$ multiplier 303 when the latch signal is active and then producing the latched data. That is, when the output of $\alpha$ multiplier 301 is equal to the arbitrary element $\alpha^k$, the output of $\alpha^{-1}$ multiplier 303 is latched by latch 304. As a result, latch 304 produces the reciprocal $\alpha^{-k}$ of the arbitrary element.

Figure 4A:
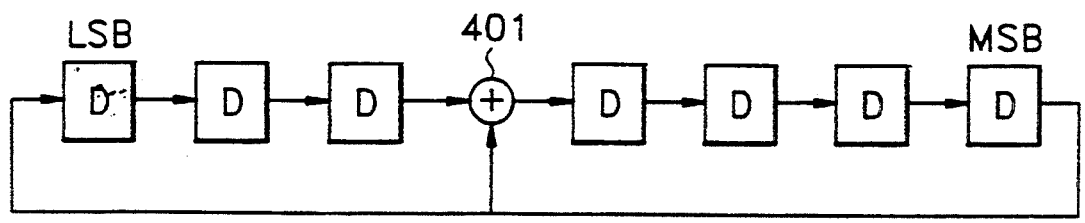
FIGS. 4A and 4B are block diagrams of an $\alpha$ multiplier and $\alpha^{-1}$ multiplier of FIG. 3, respectively.
Figure 4B:
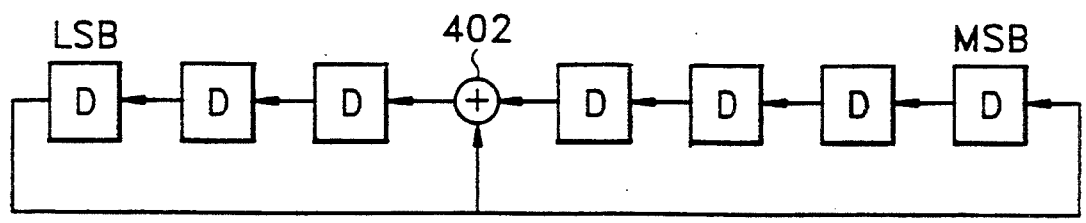

FIGS. 4A and 4B are block diagrams of an $\alpha$ multiplier and an $\alpha^{-1}$ multiplier of FIG. 3, respectively, wherein the $\alpha$ multiplier (shown in FIG. 4A) and the $\alpha^{-1}$ multiplier (shown in FIG. 4B) are constructed based on the primitive polynomial p(x) represented as $1+x^3+x^7$ in the finite field $GF(2^7)$. Here, bit representations of all elements included in the above finite field $GF(2^7)$ are listed in the following Table 1.

TABLE 1

| $p(x) = 1 + x^3 + x^7$ | | | |
|---|---|---|---|
| $0 = 0000000$ | $\alpha^{31} = 1100000$ | $\alpha^{63} = 0101000$ | $\alpha^{95} = 0011110$ |
| $\alpha^0 = 1000000$ | $\alpha^{32} = 0110000$ | $\alpha^{64} = 0010100$ | $\alpha^{96} = 0001111$ |
| $\alpha^1 = 0100000$ | $\alpha^{33} = 0011000$ | $\alpha^{65} = 0001010$ | $\alpha^{97} = 1001111$ |
| $\alpha^2 = 0010000$ | $\alpha^{34} = 0001100$ | $\alpha^{66} = 0000101$ | $\alpha^{98} = 1101111$ |
| $\alpha^3 = 0001000$ | $\alpha^{35} = 0000110$ | $\alpha^{67} = 1001010$ | $\alpha^{99} = 1111111$ |
| $\alpha^4 = 0000100$ | $\alpha^{36} = 0000011$ | $\alpha^{68} = 0100101$ | $\alpha^{100} = 1110111$ |
| $\alpha^5 = 0000010$ | $\alpha^{37} = 1001001$ | $\alpha^{69} = 1011010$ | $\alpha^{101} = 1110011$ |
| $\alpha^6 = 0000001$ | $\alpha^{38} = 1101100$ | $\alpha^{70} = 0101101$ | $\alpha^{102} = 1110001$ |
| $\alpha^7 = 1001000$ | $\alpha^{39} = 0110110$ | $\alpha^{71} = 1011110$ | $\alpha^{103} = 1110000$ |
| $\alpha^8 = 0100100$ | $\alpha^{40} = 0011011$ | $\alpha^{72} = 0101111$ | $\alpha^{104} = 0111000$ |
| $\alpha^9 = 0010010$ | $\alpha^{41} = 1000101$ | $\alpha^{73} = 1011111$ | $\alpha^{105} = 0011100$ |
| $\alpha^{10} = 0001001$ | $\alpha^{42} = 1101010$ | $\alpha^{74} = 1100111$ | $\alpha^{106} = 0001110$ |
| $\alpha^{11} = 1001100$ | $\alpha^{43} = 0110101$ | $\alpha^{75} = 1111011$ | $\alpha^{107} = 0000111$ |
| $\alpha^{12} = 0100110$ | $\alpha^{44} = 1010010$ | $\alpha^{76} = 1110101$ | $\alpha^{108} = 1001011$ |
| $\alpha^{13} = 0010011$ | $\alpha^{45} = 0101001$ | $\alpha^{77} = 1110010$ | $\alpha^{109} = 1101101$ |
| $\alpha^{14} = 1000001$ | $\alpha^{46} = 1011100$ | $\alpha^{78} = 0111001$ | $\alpha^{110} = 1111110$ |
| $\alpha^{15} = 1101000$ | $\alpha^{47} = 0101110$ | $\alpha^{79} = 1010100$ | $\alpha^{111} = 0111111$ |
| $\alpha^{16} = 0110100$ | $\alpha^{48} = 0010111$ | $\alpha^{80} = 0101010$ | $\alpha^{112} = 1010111$ |
| $\alpha^{17} = 0011010$ | $\alpha^{49} = 1000011$ | $\alpha^{81} = 0010101$ | $\alpha^{113} = 1100011$ |
| $\alpha^{18} = 0001101$ | $\alpha^{50} = 1101001$ | $\alpha^{82} = 1000010$ | $\alpha^{114} = 1111001$ |
| $\alpha^{19} = 1001110$ | $\alpha^{51} = 1111100$ | $\alpha^{83} = 0100001$ | $\alpha^{115} = 1110100$ |
| $\alpha^{20} = 0100111$ | $\alpha^{52} = 0111110$ | $\alpha^{84} = 1011000$ | $\alpha^{116} = 0111010$ |
| $\alpha^{21} = 1011011$ | $\alpha^{53} = 0011111$ | $\alpha^{85} = 0101100$ | $\alpha^{117} = 0011101$ |
| $\alpha^{22} = 1100101$ | $\alpha^{54} = 1000111$ | $\alpha^{86} = 0010110$ | $\alpha^{118} = 1000110$ |
| $\alpha^{23} = 1111010$ | $\alpha^{55} = 1101011$ | $\alpha^{87} = 0001011$ | $\alpha^{119} = 0100011$ |
| $\alpha^{24} = 0111101$ | $\alpha^{56} = 1111101$ | $\alpha^{88} = 1001101$ | $\alpha^{120} = 1011001$ |
| $\alpha^{25} = 1010110$ | $\alpha^{57} = 1110110$ | $\alpha^{89} = 1101101$ | $\alpha^{121} = 1100100$ |
| $\alpha^{26} = 0101011$ | $\alpha^{58} = 0111011$ | $\alpha^{90} = 0110111$ | $\alpha^{122} = 0110010$ |
| $\alpha^{27} = 1011101$ | $\alpha^{59} = 1010101$ | $\alpha^{91} = 1010011$ | $\alpha^{123} = 0011001$ |
| $\alpha^{28} = 1100110$ | $\alpha^{60} = 1100010$ | $\alpha^{92} = 1100001$ | $\alpha^{124} = 1000100$ |

TABLE 1-continued $p(x) = 1 + x^3 + x^7$

| | | | |
|---|---|---|---|
| $\alpha^{29}$ = 0110011 | $\alpha^{61}$ = 0110001 | $\alpha^{93}$ = 1111000 | $\alpha^{125}$ = 0100010 |
| $\alpha^{30}$ = 1010001 | $\alpha^{62}$ = 1010000 | $\alpha^{94}$ = 0111100 | $\alpha^{126}$ = 0010001 |

As shown in Table 1, the elements in the finite field are not represented in a simple increasing type, as do the general elements represented by bits, but are generated based on the primitive polynomial p(x) which is represented as $1+x^3+x^7$. The multipliers of FIGS. 4A and 4B each include seven registers, such as D-flip-flops, and XOR gates 401 and 402, respectively. Here, the XOR gates are located in accordance with the primitive polynomial. As depicted in Table 1, the primitive element $\alpha$ is represented as (0100000), which means that $\alpha$-multiplying is performed by one bit up-shifting, or right shifting (FIG. 4A), and $\alpha^{-1}$-multiplying is performed by one bit down-shifting, or left shifting, (FIG. 4B). In other words, the registers included in the $\alpha$ and $\alpha^{-1}$ multipliers apply their contents to the adjacent registers through the XOR gate, if necessary, and in accordance with the arrows. These registers load the identity element which is represented as (1000000), at first, and then performs the shifting operation at successive clock pulses. The location of XOR gates 401 and 402 is determined from the fact that $x^7$ equals $1+x^3$ based on the primitive polynomial. Hence, the output of the register corresponding to the MSB ($x^6$) is allocated to the register corresponding to the LSB ($x^0$) as well as to the register corresponding to $x^3$ through XOR gate 401, in FIG. 4A. Here, XOR gate 401 performs the exclusive-OR function with two inputs applied. On the other hand, in FIG. 4B, the output of the register corresponding to the LSB is applied to the register corresponding to the MSB as well as to XOR gate 402 which also performs the exclusive-OR function with two inputs applied.

Figure 5:
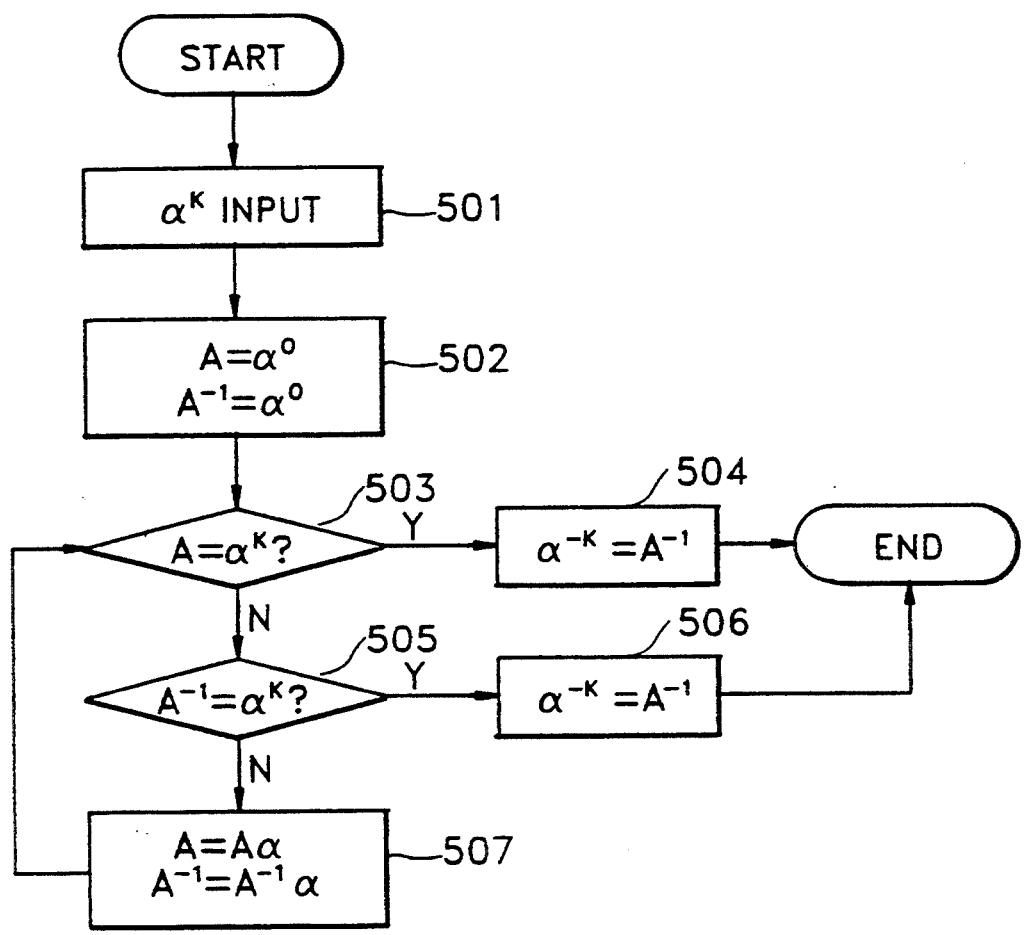
FIG. 5 is a flow chart of a method for producing the reciprocal of an arbitrary element in a finite field $GF(2^n)$, according to another embodiment of the present invention.

FIG. 5 is a flow chart of a method for producing the reciprocal of an arbitrary element $\alpha^k$ in a finite field GF($2^n$), according to still another embodiment of the present invention.

In step 501, an arbitrary element $\alpha^k$ is received, wherein the arbitrary element is constituted by n bits and pertains to the finite field GF($2^n$).

Step 502 is for substituting the identity element $\alpha^0$ for variables A and $A^{-1}$ for initialization. Here, the bit representation of $\alpha^0$ is (100 ... 0) wherein the MSB is located on the right and the LSB is located on the left.

In step 503, it is determined whether the content of the variable A is equal to the arbitrary element $\alpha^k$. If the content of the variable A is equal to $\alpha^k$, the computation advances to step 504, and is otherwise advanced to step 505.

Step 504 is performed when the content of variable A is equal to $\alpha^k$, and the content of variable $A^{-1}$ is produced as the reciprocal $\alpha^{-1}$ of the arbitrary element $\alpha^k$.

On the other hand, in step 505, it is determined whether the content of variable $A^{-1}$ is equal to the arbitrary element $\alpha^k$. If the content of variable $A^{-1}$ is equal to the arbitrary element $\alpha^k$, step 506 is performed as the next step. Otherwise, step 507 is performed as the next step.

In step 506 (reached when the content of variable $A^{-1}$ is equal to the arbitrary element $\alpha^k$), the content of variable A is output as the reciprocal $\alpha^{-k}$ of the arbitrary element $\alpha^k$.

Step 507 multiplies variables A and $A^{-1}$ by the primitive element $\alpha$ and its reciprocal $\alpha^k$, respectively, and then replaces the variables A and $A^{-1}$ with the above results, respectively. Step 507 for multiplying is recursively performed until the content of variable A or $A^{-1}$ is equal to the arbitrary element $\alpha^k$.

Figure 6:
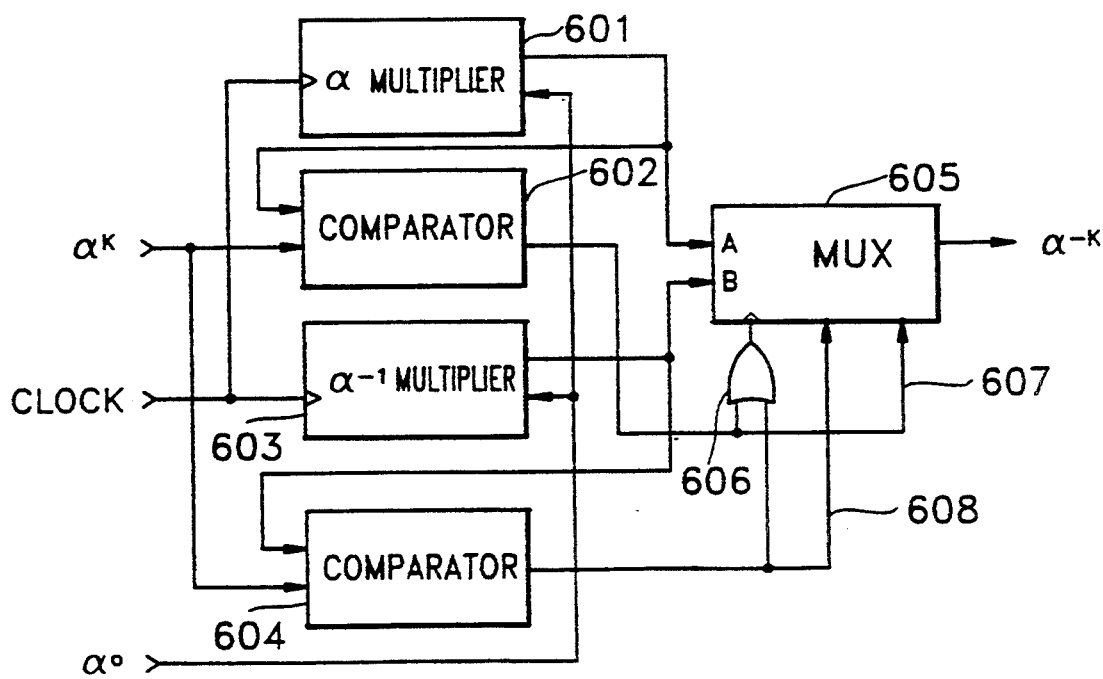
FIG. 6 is a block diagram of an apparatus which produces the reciprocal of an arbitrary element in a finite field. $GF(2^n)$, which performs the method explained in FIG. 5.

FIG. 6 is a block diagram of an apparatus which produces the reciprocal of an arbitrary element in a finite field GF($2^n$), according to still another embodiment of the present invention. The apparatus includes an $\alpha$ multiplier 601, comparators 602 and 604, an $\alpha^{-1}$ multiplier 603, a selector 605, and a logic gate 606. The apparatus also includes an identity element generator for generating the identity element $\alpha^0$ in the finite field GF($2^n$), which is not shown in FIG. 6.

Referring to FIG. 6, comparator 602 produces a first selecting signal 607 indicating whether the output of $\alpha$ multiplier 601 is equal to the arbitrary element $\alpha^k$, whereas comparator 604 produces a second selecting signal 608 which indicates whether the output of $\alpha^{-1}$ multiplier 603 is equal to the arbitrary element $\alpha^k$. Selector 605 selects the output of $\alpha$ multiplier 601 when the second selecting signal 608 is active and selects the output of the $\alpha^{-1}$ multiplier 603 when the first selecting signal is active, in order to produce the selected one as the reciprocal $\alpha^{-k}$ of the arbitrary element $\alpha^k$. Here, the clock input of the selector 605 receives the output of OR gate 606 which receives the first and second selecting signals 607 and 608 to perform the logic OR function. The method and the apparatus explained with reference to FIG. 5 and FIG. 6 can produce the reciprocal faster than those explained with reference to FIGS. 2 and 3. Another method, for obtaining reciprocals even faster, suggests that the clock frequency applied to the $\alpha$ multiplier and the $\alpha^{-1}$ multiplier should be increased.

As described above, the apparatus for producing the reciprocal of an arbitrary element according to the present invention is constituted by simple hardware, which results in reducing the cost and the chip area required for its implementation, as compared with the conventional look-up table technology.

What is claimed is:

1. An apparatus for producing the reciprocal of an arbitrary element in a finite field having a primitive element, the reciprocal of the primitive element and an identity element for multiplying, the apparatus comprising:

first means for generating said identity element;

second means for receiving said identity element and multiply said identity element by the primitive element, and then recursively multiplying the multiplication result with the primitive element to produce a first element;

third means for receiving said identity element and multiplying said identity element by the reciprocal of the primitive element, and then recursively multiplying the multiplication result with the reciprocal of the primitive element to produce a second element; and fourth means for comparing the first element with the arbitrary element to produce said second element as the reciprocal of the arbitrary element when the first element equals the arbitrary element.

2. An apparatus according to claim 1, wherein the second means comprises:
- a shift register comprising a plurality of flip-flops for shifting bits representing said identity elements by clock pulses; and
- at least one XOR gate for performing a logical exclusive-OR function of at least two bits being shifted by said plurality of flip-flops, said at least one XOR gate being selectively located between flip-flops based on the primitive polynomial corresponding the finite field.

3. An apparatus according to claim 1, wherein the third means comprises:
- a shift register comprising a plurality of flip-flops for shifting bits representing said identity elements by clock pulses; and
- at least one XOR gate for performing a logical exclusive-OR function of at least two bits being shifted by said plurality of flip-flops, said at least one XOR gate being selectively located between flip-flops based on the primitive polynomial corresponding the finite field.

4. An apparatus for producing the reciprocal of an arbitrary element in a finite field having a primitive element, the reciprocal of said primitive element and an identity element for multiplying, the apparatus comprising:
- first means for generating said identity element;
- second means for receiving said identity element and multiplying said identity element by the primitive element, and then recursively multiplying the multiplication result with the primitive element to produce a first element;
- third means for receiving said identity element and multiplying said identity element by the reciprocal primitive element, and then recursively multiplying the multiplication result with the reciprocal of the primitive element to produce a second element; and
- fourth means for comparing the first element with the arbitrary element to produce the second element as the reciprocal of the arbitrary element when the first element equals the arbitrary element and comparing the second element with the arbitrary element to produce the first element as the reciprocal of the arbitrary element when the second element equals the arbitrary element.

5. An apparatus according to claim 4, wherein said fourth means comprises:
- first comparing means for comparing the second element with the arbitrary element to produce a first selecting signal indicating whether the second element is the same as the arbitrary element;
- second comparing means for comparing the first element with the arbitrary element to produce second selecting signal indicating whether the first element is the same as the arbitrary element; and
- selecting means for selecting between the first element and the second element in accordance with the first selecting signal and the second selecting signal, in order to produce the reciprocal of the arbitrary element.

6. An apparatus according to claim 4, wherein the second means comprises:
- a shift register comprising a plurality of flip-flops for shifting bits representing said identity elements by clock pulses; and
- at least one XOR gate for performing a logical exclusive-OR function of at least two bits being shifted by said plurality of flip-flops, said at least one XOR gate being selectively located between flip-flops based on the primitive polynomial corresponding the finite field.

7. An apparatus according to claim 4, wherein the third means comprises:
- a shift register comprising a plurality of flip-flops for shifting bits representing said identity elements by clock pulses; and
- at least one XOR gate for performing a logical exclusive-OR function of at least two bits being shifted by said plurality of flip-flops, said at least one XOR gate being selectively located between flip-flops based on the primitive polynomial corresponding the finite field.

8. An apparatus according to claim 4, wherein the arbitrary element is a syndrome produced in decoding of an error correcting code.

* * * * *